(12) United States Patent
Sasaki

(10) Patent No.: US 10,150,508 B2
(45) Date of Patent: Dec. 11, 2018

(54) VEHICLE FRAME STRUCTURE

(71) Applicant: TOYOTA JIDOSHA KABUSHIKI KAISHA, Toyota-shi (JP)

(72) Inventor: Takashi Sasaki, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 332 days.

(21) Appl. No.: 15/225,995

(22) Filed: Aug. 2, 2016

(65) Prior Publication Data

US 2017/0096170 A1    Apr. 6, 2017

(30) Foreign Application Priority Data

Oct. 1, 2015   (JP) ................................. 2015-195808

(51) Int. Cl.
*B62D 21/15* (2006.01)
*B62D 25/08* (2006.01)

(52) U.S. Cl.
CPC ......... *B62D 21/155* (2013.01); *B62D 21/152* (2013.01); *B62D 25/08* (2013.01)

(58) Field of Classification Search
CPC ...... B60N 3/102; B60N 3/108; B62D 21/155; B62D 25/08; B62D 21/152
USPC ..................................................... 296/24.34
See application file for complete search history.

(56) References Cited

U.S. PATENT DOCUMENTS

| | | | |
|---|---|---|---|
| 9,868,468 B1* | 1/2018 | Park | B62D 21/152 |
| 10,017,208 B2* | 7/2018 | Sekiya | B60R 19/02 |
| 2013/0069393 A1 | 3/2013 | Kihara et al. | |
| 2017/0203794 A1* | 7/2017 | Nakamura | B62D 25/025 |

FOREIGN PATENT DOCUMENTS

| | | |
|---|---|---|
| JP | 2013-136362 | 7/2013 |
| WO | WO 2011/148747 A1 | 12/2011 |

* cited by examiner

*Primary Examiner* — Pinel E Romain
(74) *Attorney, Agent, or Firm* — Oblon, McClelland, Maier & Neustadt, L.L.P.

(57) ABSTRACT

The present disclosure provides a vehicle frame structure including a front side member base portion in which a rear end portion of an outer-side side wall portion of a front side connecting portion that is joined to the front side member main body portion, and a front end flange portion of a rear side first connecting portion that is joined to a rocker, are connected by a first curved wall portion. Further, a rear end portion of an inner-side side wall portion of the front side connecting portion, and a front end portion of a rear side second connecting portion that is joined to a tunnel, are connected by a second curved wall portion. A minimum radius curvature at a curve of the first curved wall portion is set to be larger than a minimum radius curvature at a curve of the second curved wall portion.

2 Claims, 3 Drawing Sheets

VEHICLE FRAME STRUCTURE

CROSS-REFERENCE TO RELATED APPLICATION

This application claims priority under 35 USC 119 from Japanese Patent Application No. 2015-195808 filed on Oct. 1, 2015, the disclosure of which is incorporated by reference herein.

BACKGROUND

Technical Field

The present disclosure relates to a vehicle frame structure.

Related Art

Techniques of dispersing and transmitting collision load that is inputted to a front side member at the time of a front collision of a vehicle are known (see, for example, International Publication No. 2011/148747 and Japanese Patent Application Laid-Open (JP-A) No. 2013-136362).

There are cases in which the front side member main body, that is disposed at the side portion of the vehicle body front portion, is inclined toward the vehicle body transverse direction outer side while heading toward the vehicle body front side, from the standpoint of addressing a collision that is such that the automobile front-collides with a collision object such as a barrier or the like in a state in which the amount of overlap therebetween in the vehicle transverse direction is small (a small overlap collision), or the like. However, in such a structure, at the time of a front collision of the vehicle, a large bending moment arises, and it is easy for the supporting portion of the rear end portion of the front side member main body portion to bend toward the vehicle body transverse direction outer side. Further, if the supporting portion of the rear end portion of the front side member main body portion bends, the efficiency of transmitting the collision load decreases.

SUMMARY

The present disclosure provides a vehicle frame structure at which, even in a case in which a front side member main body portion is inclined toward the vehicle body transverse direction outer side while heading toward the vehicle body front side, collision load may be transmitted well by preventing or suppressing bending of the supporting portion of the rear end portion of the front side member main body portion at the time of a front collision of the vehicle.

A first aspect is a vehicle frame structure including: a front side member main body portion disposed at a side portion of a vehicle body front portion, at an incline toward a vehicle body transverse direction outer side on progression toward a vehicle body front side; and a front side member base portion extending along a dash panel toward a vehicle body rear and lower side, and formed in a shape such that a rear end side of the front side member base portion is wider in a vehicle body transverse direction than a front end side of the front side member base portion, the front side member base portion being joined to the dash panel and structured by a single member, and a vehicle body transverse direction intermediate portion of the front side member base portion being joined to a front end portion of a floor under reinforcement, the front side member base portion including: a front side connecting portion joined to an outer peripheral surface of a rear end portion of the front side member main body portion in a state of covering the outer peripheral surface; a rear side first connecting portion joined to a front end portion of a rocker; a rear side second connecting portion that is joined to a front end portion of a tunnel; a first curved wall portion connecting a rear end portion of a side wall portion at a vehicle body transverse direction outer side of the front side connecting portion and a front end portion of the rear side first connecting portion, the first curved wall portion being curved so as to be concave obliquely toward a vehicle body rear side and a vehicle body transverse direction inner side; and a second curved wall portion connecting a rear end portion of a side wall portion at a vehicle body transverse direction inner side of the front side connecting portion and a front end portion of the rear side second connecting portion, the second curved wall portion being curved so as to be concave obliquely toward the vehicle body rear side and the vehicle body transverse direction outer side, and the front side member base portion being configured such that a relationship between a minimum radius of curvature R1 at a curve of the first curved wall portion and a minimum radius of curvature R2 at a curve of the second curved wall portion satisfies R1>R2.

In accordance with the above-described structure, the front side member main body portion is disposed at a side portion of a vehicle body front portion, at an incline toward the vehicle body transverse direction outer side while heading toward the vehicle body front side. Therefore, in a case in which collision load is inputted to the front end portion of the front side member main body portion at the time of a front collision of the vehicle, load, that attempts to displace the front end portion side of the front side member main body portion toward the vehicle body transverse direction outer side, is applied.

The front side connecting portion of the front side member base portion is joined to the outer peripheral surface of the rear end portion of the front side member main body portion, in a state of covering this outer peripheral surface. The front side member base portion is joined to the dash panel, and extends toward the vehicle body rear and lower side along the dash panel, and is a shape in which the rear end side thereof is wider in the vehicle body transverse direction than the front end side thereof. Therefore, the supporting rigidity of the front side member base portion with respect to load, that attempts to displace the front end portion side of the front side member main body portion in the vehicle body transverse direction, is high as compared with a case in which, for example, the supporting portion of the rear end portion of the front side member main body portion is set in a rectilinear form in the vehicle body longitudinal direction as seen in a vehicle body bottom view.

Further, the vehicle body transverse direction intermediate portion of the front side member base portion is joined to the front end portion of the floor under reinforcement, and the rear side first connecting portion is joined to the front end portion of the rocker, and the rear side second connecting portion is joined to the front end portion of the tunnel. Due thereto, the collision load that is inputted to the front side member main body portion is, via the front side member base portion, transmitted and dispersed to the floor under reinforcement, the rocker and the tunnel, respectively. Therefore, the burden of the load that is applied to the front side connecting portion of the front side member base portion is reduced. Further, because the front side member base portion is structured by a single member, it is advantageous in terms of ensuring the supporting rigidity by the front side member base portion, and, in addition, the collision load, that is transmitted from the front side member main body portion to the front side member base portion, can be transmitted directly (without going through another member) to the floor under reinforcement, the rocker and the tunnel.

Moreover, at front side member base portion, the first curved wall portion thereof connects the rear end portion of the side wall portion at the vehicle body transverse direction outer side of the front side connecting portion and the front end portion of the rear side first connecting portion, and is curved so as to be concave toward the obliquely vehicle body rear side and vehicle body transverse direction inner side. The second curved wall portion connects the rear end portion of the side wall portion at the vehicle body transverse direction inner side of the front side connecting portion and the front end portion of the rear side second connecting portion, and is curved so as to be concave toward the obliquely vehicle body rear side and vehicle body transverse direction outer side. Accordingly, in a case in which collision load is transmitted from the front side member main body portion to the front side member base portion at the time of a front collision of the vehicle, a portion of the collision load is transmitted smoothly to the rocker with the first curved wall portion being a load transmission path, and another portion of the collision load is transmitted smoothly to the tunnel with the second curved wall portion being a load transmission path.

Here, the minimum radius of curvature R1 at the curved shape of the first curved wall portion is set to be larger than the minimum radius of curvature at the curved shape of the second curved wall portion. Therefore, at the front side member base portion, the bending rigidity with respect to load, that attempts to bend the front side member base portion toward the first curved wall portion side (the vehicle body transverse direction outer side), is higher than the bending rigidity with respect to the load that attempts to bend the front side member base portion toward the second curved wall portion side (the vehicle body transverse direction inner side). Accordingly, at the time of a front collision, the front side member base portion bending toward the vehicle body transverse direction outer side can be suppressed effectively.

A second aspect, in the above-described first aspect, the front end portion of the rear side first connecting portion may be joined to a front end surface, that faces toward the vehicle body front side, at a frontmost end of the rocker, and the first curved wall portion may be curved along a circular arc having respective tangent lines, as seen in a vehicle body bottom view, of a first virtual straight line passing through a side surface at the vehicle body transverse direction outer side of the front side connecting portion and extending in a direction of extension of the side surface, and a second virtual straight line passing through a front end surface of the rear side first connecting portion and extending in the vehicle body transverse direction, and the circular arc passes through a rear end of the side surface at the vehicle body transverse direction outer side of the front side connecting portion and through a vehicle body transverse direction inner side end of a front end surface of the rear side first connecting portion.

In accordance with the above-described structure, the radius of curvature R1 of the first curved wall portion can be set to be large, while the rear end portion of the side wall portion at the vehicle body transverse direction outer side of the front side connecting portion and the front end portion of the rear side first connecting portion are connected gently by the first curved wall portion. Therefore, while the ability to transmit load from the front side member base portion to the rocker at the time of a front collision of the vehicle is ensured well, the bending rigidity with respect to load, that attempts to bend the front side member base portion toward the first curved wall portion side (the vehicle body transverse direction outer side), may be ensured well.

As described above, in accordance with the vehicle frame structure of the present disclosure, even in a case in which a front side member main body portion is disposed at an incline toward a vehicle body transverse direction outer side while heading toward a vehicle body front side, collision load may be transmitted well by preventing or suppressing bending of a supporting portion of the rear end portion of the front side member main body portion at the time of a front collision of the vehicle.

BRIEF DESCRIPTION OF THE DRAWINGS

Exemplary embodiments will be described in detail based on the following figures, wherein.

DETAILED DESCRIPTION

Figure 1:
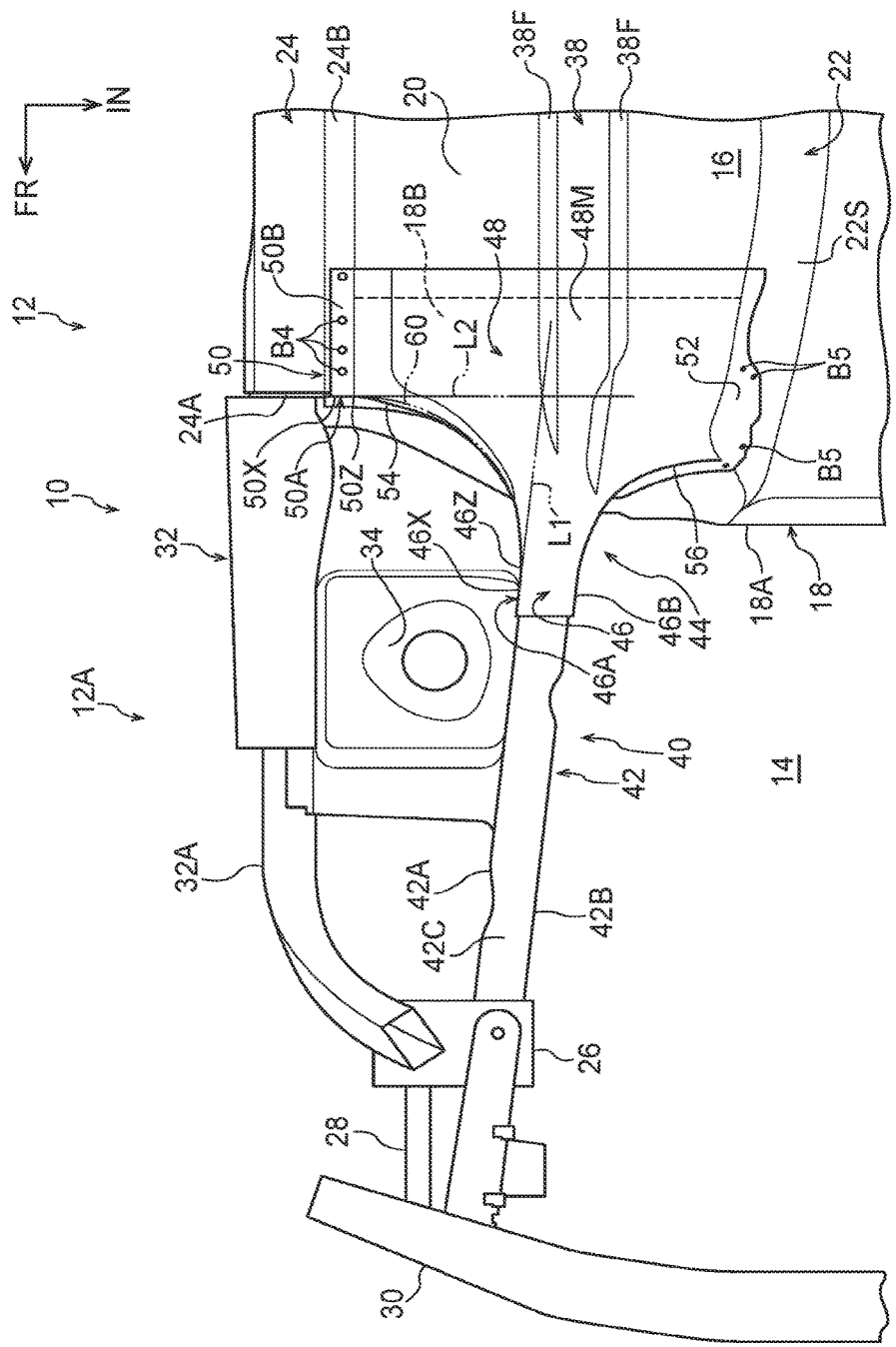
FIG. 1 is a bottom view illustrating a vehicle frame structure relating to an embodiment of the present disclosure.
Figure 2:
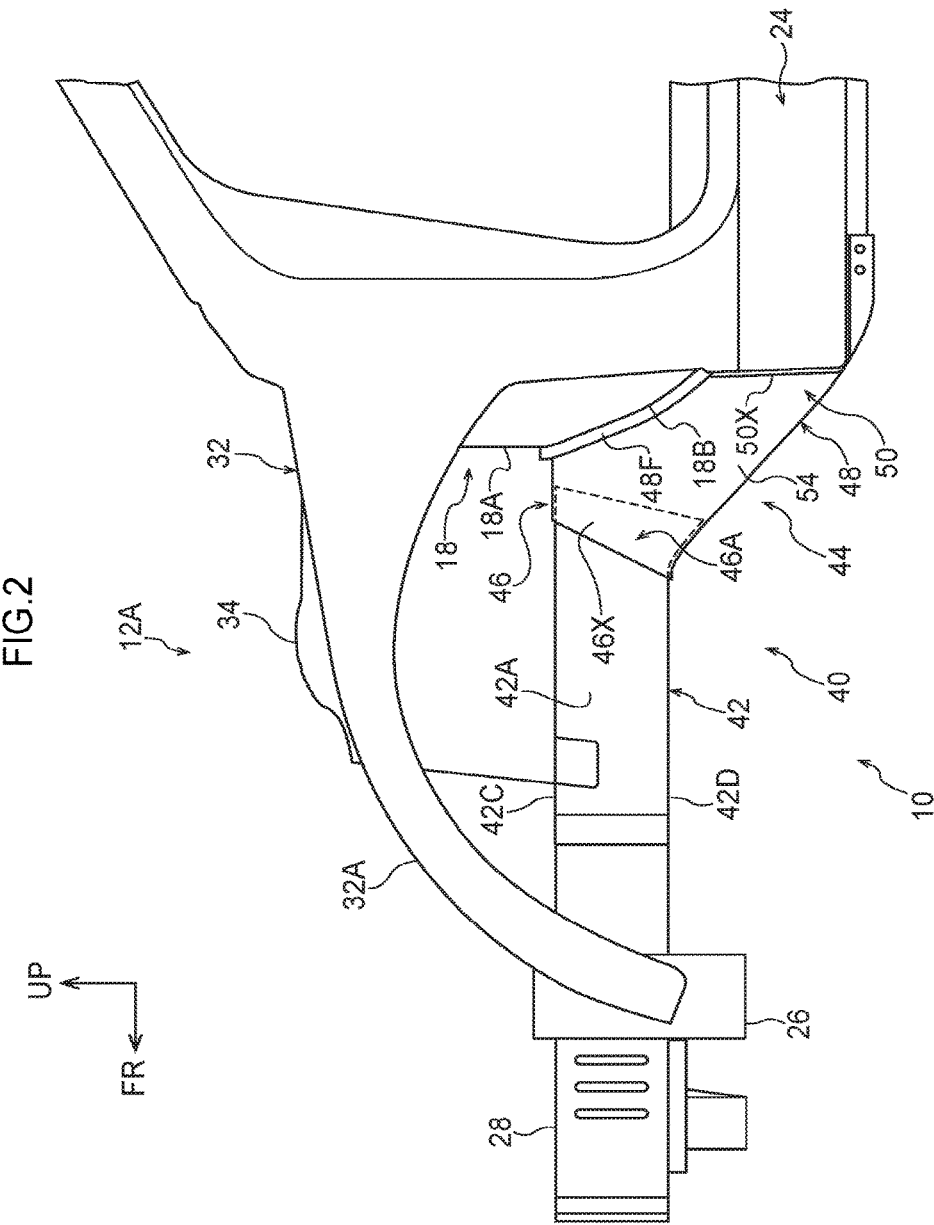
FIG. 2 is a side view illustrating the vehicle frame structure of FIG. 1 in a state of being viewed from a vehicle body transverse direction outer side (a vehicle body left side)
Figure 3:
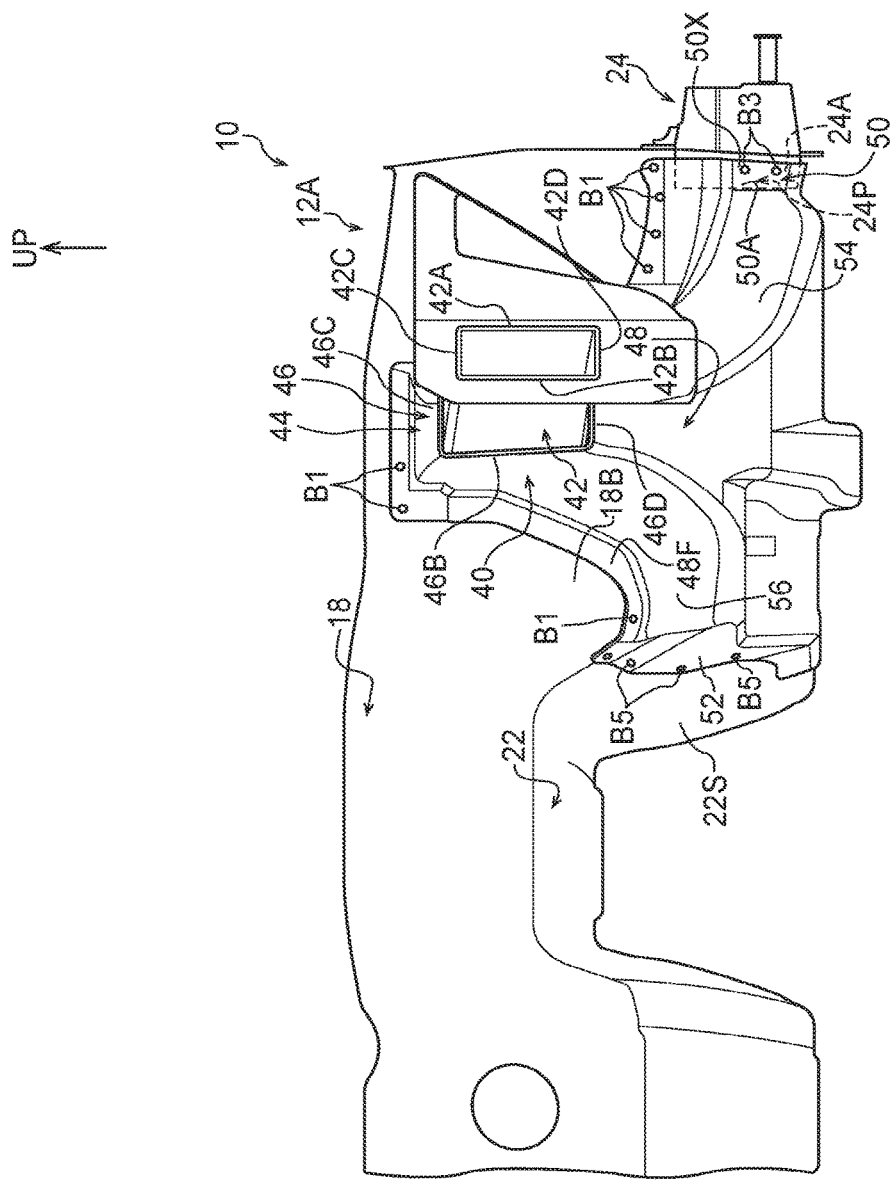
FIG. 3 is a perspective view illustrating the vehicle frame structure of FIG. 1 in a state of being viewed from an obliquely front side of a vehicle body.

A vehicle frame structure relating to an embodiment of the present disclosure is described by using FIG. 1 through FIG. 3. Note that arrow FR that is illustrated appropriately in these drawings indicates the vehicle body front side, arrow UP indicates the vehicle body upper side, and arrow IN indicates the vehicle body transverse direction inner side. Further, when description is given hereinafter by merely using longitudinal, vertical and left-right directions, they mean the longitudinal of the vehicle body longitudinal direction, the vertical of the vehicle body vertical direction, and the left and the right when facing in the vehicle advancing direction, unless otherwise indicated.

A portion of the vehicle body left side of an automobile (a vehicle) 12, to which a vehicle frame structure 10 relating to the present embodiment is applied, is illustrated in a bottom view in FIG. 1. Note that illustration of the vehicle body right side is omitted from FIG. 1, but the vehicle frame structure 10 is structured so as to be basically symmetrical at the left and the right. Further, a side view of a state, in which the vehicle frame structure 10 of FIG. 1 is viewed from the vehicle body left side (a vehicle body transverse direction outer side) is illustrated in FIG. 2. A perspective view of a state, in which the vehicle frame structure 10 of FIG. 1 is viewed from an obliquely front side of the vehicle body, is illustrated in FIG. 3. Note that, in FIG. 3, illustration of a front side member 40 and the like at the vehicle body right side is omitted in order to make the drawing easy to understand.

As illustrated in FIG. 1, at the automobile 12, a power unit chamber 14 and a cabin (vehicle cabin) 16, that is positioned at the vehicle rear side of the power unit chamber 14, are partitioned by a dash panel (vehicle body passenger compartment front wall) 18. The upper portion of the dash panel 18 has a vertical plate portion 18A that is formed substantially in the shape of a vertical plate. As illustrated in FIG. 2, the lower portion of the dash panel 18 has a toe board portion 18B that is provided integrally with the vertical plate portion 18A and that is formed in the shape of an inclined plate. The toe board portion 18B is inclined toward the vehicle body rear side while heading toward the vehicle body lower side. As illustrated in FIG. 1, the front end portion of a floor panel 20 is joined, by welding or the like, to and is made integral with the lower end portion of the toe board portion 18B. This floor panel 20 structures the floor surface of the cabin 16.

A tunnel 22 is provided at the vehicle body transverse direction central portions of the toe board portion 18B and the floor panel 20. As seen in a vehicle body front view, the tunnel 22 opens toward the vehicle body lower side and is formed in a substantially upside-down U-shape, and extends in the vehicle body longitudinal direction. Further, the end portion at the vehicle body transverse direction outer side of the floor panel 20 is joined to a rocker (also called a "side sill") 24. The rocker 24 is a frame member that has a closed cross-sectional structure and that extends in the vehicle body longitudinal direction at the lower end portion of the vehicle body side portion, and is disposed in a range that includes the lower edge side of a side door opening portion. The frontmost end of the rocker 24 is closed-off by a front wall panel 24P (see FIG. 3) that faces toward the vehicle body front side, and a front end surface 24A of the rocker 24 (the front surface of the front wall panel 24P (see FIG. 3)) is disposed such that a plane, that includes the vehicle body transverse direction and the vehicle body vertical direction, is the surface direction thereof.

Moreover, a floor under reinforcement 38 is provided at the vehicle body transverse direction inner side of the rocker 24 and the vehicle body transverse direction outer side of the tunnel 22. The floor under reinforcement 38 is a frame member that, as seen in a vehicle body front view, is formed in the shape of an upside-down hat that opens toward the vehicle body upper side, and that extends in the vehicle body longitudinal direction. A pair of left and right flange portions 38F of the floor under reinforcement 38 are joined to the bottom surface of the floor panel 20 and the bottom surface of the toe board portion 18B.

An unillustrated power unit is housed in the power unit chamber 14 that is formed further toward the vehicle body front side than the cabin 16. In the present embodiment, as an example, the power unit is structured to include an engine and a motor. Further, the power unit chamber 14 can be regarded as being a so-called engine compartment.

Front side member main body portions 42, that structure the main body portions of the pair of left and right front side members 40, are provided at the lower portion of the power unit chamber 14 at the vehicle body transverse direction both sides. The front side member main body portion 42 extends along the vehicle body longitudinal direction at the side portion of a vehicle body front portion 12A, and, in further detail, is disposed so as to be inclined toward the vehicle body transverse direction outer side while heading toward the vehicle body front side. Note that the front side member 40 is described later. A crash box 28 is fixed to the front end portion of the front side member main body portion 42 via a connecting member 26. Further, as illustrated in FIG. 1 and FIG. 2, an apron upper member 32 is disposed at the vehicle transverse direction outer side and upper side of the front side member main body portion 42. This apron upper member 32 extends in the vehicle longitudinal direction. A front end portion of an apron brace 32A, that structures the front portion of the apron upper member 32, is fixed to the connecting member 26. Further, a suspension tower 34 is provided between the rear portion of the front side member main body portion 42 and the rear portion of the apron upper member 32.

As illustrated in FIG. 1, a bumper reinforcement 30 is fixed to the front end portion of the crash box 28. The bumper reinforcement 30 is disposed at the vehicle body front portion 12A with the vehicle body transverse direction being the length direction thereof. Note that the bumper reinforcement 30 structures a portion of the front bumper.

On the other hand, the pair of left and right front side member main body portions 42 support the power unit via an engine mount (not illustrated). Further, the front side member main body portions 42 are made of an aluminum alloy in the present embodiment.

As illustrated in FIG. 3, the front side member main body portion 42 forms a closed cross-section portion whose cross-sectional shape orthogonal to the length direction is rectangular. Namely, as a pair of left and right side-wall portions, the front side member main body portion 42 has an outer-side side wall portion 42A (see FIG. 2) that structures the side wall portion at the vehicle body transverse direction outer side, and an inner-side side wall portion 42B that structures the side wall portion at the vehicle body transverse direction inner side. Further, the front side member main body portion 42 has an upper wall portion 42C that connects the upper ends of the outer-side side wall portion 42A and the inner-side side wall portion 42B together in the vehicle body transverse direction, and has a lower wall portion 42D that connects the lower ends of the outer-side side wall portion 42A and the inner-side side wall portion 42B together in the vehicle body transverse direction.

The front side member 40 has a front side member base portion 44 (also called "kick reinforcement") at the rear end portion side of the front side member main body portion 42. The front side member base portion 44 is structured by a single, die cast member that is made of an aluminum alloy. The front side member base portion 44 has, at the front end portion side thereof, a front side connecting portion 46 that is shaped as an angular tube.

Namely, as a pair of left and right side wall portions, the front side connecting portion 46 of the front side member base portion 44 has an outer-side side wall portion 46A (see FIG. 2) that structures the side wall portion at the vehicle body transverse direction outer side, and an inner-side side wall portion 46B that structures the side wall portion at the vehicle body transverse direction inner side. Further, the front side connecting portion 46 of the front side member base portion 44 has an upper wall portion 46C that connects the upper ends of the outer-side side wall portion 46A (see FIG. 2) and the inner-side side wall portion 46B together in the vehicle body transverse direction, and has a lower wall portion 46D that connects the lower ends of the outer-side side wall portion 46A (see FIG. 2) and the inner-side side wall portion 46B together in the vehicle transverse direction. The front side member base portion 44 is joined by arc welding (via a linear welded portion) in a state in which the front side connecting portion 46 covers the outer peripheral surface of the rear end portion of the front side member main body portion 42.

Further, the front side member base portion 44 extends toward the vehicle body rear and lower side along the dash panel 18 (the toe board portion 18B) as illustrated in FIG. 2. Furthermore, the front side member base portion 44 has a shape in which the rear end side thereof is wider in the vehicle body transverse direction than the front end side thereof as seen in a vehicle body bottom view as illustrated in FIG. 1. Note that, in the present embodiment, the rear end portion of the front side member base portion 44 extends to the lower surface side of the front end portion of the floor panel 20. As illustrated in FIG. 3, a kick portion 48, that is disposed along the dash panel 18 (the toe board portion 18B) at the front side member base portion 44, has, at the outer peripheral portion thereof, a flange portion 48F that is superposed on the dash panel 18. The flange portion 48F of the kick portion 48 is joined by known fixing implements B1, such as tapping screws or the like, to the dash panel 18. Note that, although illustration and detailed description thereof are omitted, reinforcing ribs are formed as appropriate at the inner surface side of the kick portion 48 (the surface thereof that faces the dash panel 18).

As illustrated in FIG. 1, a protruding portion 48M, that protrudes-out toward the vehicle body lower side and that extends in the vehicle body longitudinal direction, is formed at the vehicle body transverse direction intermediate portion of the kick portion 48. The protruding portion 48M of the kick portion 48 is disposed in a state of covering the front end portion of the floor under reinforcement 38, and is joined to the floor under reinforcement 38 by known fixing implements (not illustrated) such as tapping screws or the like.

A rear side first connecting portion 50 extends-out from the vehicle body transverse direction outer side end portion of the rear portion of the kick portion 48. The rear side first connecting portion 50 has a front end flange portion 50A (see FIG. 3) that structures the front end portion of the rear side first connecting portion 50 and faces toward the vehicle body front side, and has a horizontal flange portion SOB that extends from the lower end of the front end flange portion 50A toward the vehicle body rear side. As illustrated in FIG. 3, the front end flange portion 50A is joined to the front end surface 24A of the rocker 24 by known fixing implements B3 such as tapping screws or the like. Further, as illustrated in FIG. 1, the horizontal flange portion 50B is joined to the front end portion of a bottom wall portion 24B of the rocker 24 by known fixing implements B4 such as tapping screws or the like.

Further, as illustrated in FIG. 3, a rear side second connecting portion 52 extends-out from the vehicle body transverse direction inner side of the kick portion 48 toward the lower portion side of a side wall portion 22S of the tunnel 22. The rear side second connecting portion 52 is joined to the front end portion of the lower portion of the side wall portion 22S of the tunnel 22 by known fixing implements B5 such as tapping screws or the like. As illustrated in FIG. 1, the vehicle body longitudinal direction position of the front end of the rear side second connecting portion 52 is set to be further toward the vehicle body front side than the vehicle body longitudinal direction position of the front end of the rear side first connecting portion 50.

The rear end portion of the outer-side side wall portion 46A of the front side connecting portion 46 and the front end flange portion 50A (the front end portion) of the rear side first connecting portion 50 are connected by a first curved wall portion 54 that is shaped as a vertical wall. The first curved wall portion 54 is curved so as to be concave toward the obliquely vehicle body rear side and vehicle body transverse direction inner side (in the present embodiment, is curved approximately in the shape of a circular arc). More concretely, the first curved wall portion 54 is curved along a circular-arc shape 60 whose tangent lines are respectively a first virtual straight line L1, that, as seen in a vehicle body bottom view, passes through a side surface 46X at the vehicle body transverse direction outer side of the front side connecting portion 46 and extends in the extending direction of this side surface 46X, and a second virtual straight line L2, that passes through a front end surface 50X of the rear side first connecting portion 50 and extends in the vehicle body transverse direction, and the circular-arc shape 60 passes through a rear end 46Z of the side surface 46X at the vehicle body transverse direction outer side of the front side connecting portion 46 and through a vehicle body transverse direction inner side end 50Z of the front end surface 50X of the rear side first connecting portion 50. Note that, in the drawing, the portion of the circular-arc shape 60, that is other than the portion thereof indicated by the two-dot chain line, overlaps the first curved wall portion 54.

Further, as illustrated in FIG. 1 and FIG. 3, the rear end portion of the inner-side side wall portion 46B of the front side connecting portion 46 and the front end portion of the rear side second connecting portion 52 are joined gently by a second curved wall portion 56 that is shaped as a vertical wall. The second curved wall portion 56 is curved so as to be concave toward the obliquely vehicle body rear side and vehicle body transverse direction outer side (in the present embodiment, is curved approximately in the shape of a circular arc). Further, the relationship between minimum radius of curvature R1 at the curved shape of the first curved wall portion 54 and minimum radius of curvature R2 at the curved shape of the second curved wall portion 56 is set to be R1>R2.

Operation and functions of the above-described embodiment are described next.

As illustrated in FIG. 1, the front side member main body portion 42 is disposed at the side portion of the vehicle body front portion 12A, at an incline toward the vehicle body transverse direction outer side while heading toward the vehicle body front side. Therefore, in a case in which collision load is inputted to the front end portion of the front side member main body portion 42 at the time of a front collision of the vehicle, load, that attempts to displace the front end portion side of the front side member main body portion 42 toward the vehicle body transverse direction outer side, is applied.

The front side connecting portion 46 of the front side member base portion 44 is joined, in a covering state, to the outer peripheral surface of the rear end portion of the front side member main body portion 42. The front side member base portion 44 is joined to the dash panel 18 and extends toward the vehicle body rear and lower side along the dash panel 18, and is shaped such that the rear end side thereof is wider in the vehicle body transverse direction than the front end side thereof. Therefore, the supporting rigidity of the front side member base portion 44, with respect to load that attempts to displace the front end portion side of the front side member main body portion 42 in the vehicle body transverse direction, is high as compared with a case in which, for example, the supporting portion of the rear end portion of the front side member main body portion is set in a rectilinear form in the vehicle body longitudinal direction as seen in a vehicle body bottom view.

Further, the vehicle body transverse direction intermediate portion of the front side member base portion 44 is joined to the front end portion of the floor under reinforcement 38, and the rear side first connecting portion 50 is joined to the front end portion of the rocker 24, and the rear side second connecting portion 52 is joined to the front end portion of the tunnel 22. Due thereto, collision load that is inputted to the front side member main body portion 42 is, via the front side member base portion 44, transmitted and dispersed to the floor under reinforcement 38, the rocker 24 and the tunnel 22 respectively. Therefore, the burden of the load that is applied to the front side connecting portion 46 of the front side member base portion 44 may be reduced.

Further, because the front side member base portion 44 is structured by a single member, it is advantageous in terms of ensuring the supporting rigidity by the front side member base portion 44, and, in addition, the collision load, that is transmitted from the front side member main body portion 42 to the front side member base portion 44, can be transmitted directly (without going through another member) to the floor under reinforcement 38, the rocker 24 and the tunnel 22. Namely, in the structure of the present embodiment, the supporting rigidity is high, and, in addition, the ability to transmit load to the rocker 24 and the tunnel 22 at the time of a front collision is good, as compared with a comparative structure in which, for example, the supporting portion of the rear end portion of the front side member main body portion is set in a rectilinear form substantially in the vehicle body longitudinal direction as seen in a vehicle body bottom view and is joined to the front end portion of the floor under reinforcement, and torque boxes that are separate members are provided between that supporting portion and the front end portion of the floor under reinforcement and the rocker, and between that supporting portion and the front end portion of the floor under reinforcement and the tunnel.

Moreover, at the front side member base portion 44, the first curved wall portion 54 thereof connects the rear end portion of the outer-side side wall portion 46A of the front side connecting portion 46 and the front end flange portion 50A of the rear side first connecting portion 50, and is curved so as to be concave toward the obliquely vehicle body rear side and vehicle body transverse direction inner side. The second curved wall portion 56 connects the rear end portion of the inner-side side wall portion 46B of the front side connecting portion 46 and the front end portion of the rear side second connecting portion 52, and is curved so as to be concave toward the obliquely vehicle body rear side and vehicle body transverse direction outer side. Accordingly, in a case in which collision load is transmitted from the front side member main body portion 42 to the front side member base portion 44 at the time of a front collision of the vehicle, a portion of the collision load may be transmitted smoothly to the rocker 24 with the first curved wall portion 54 being a load transmission path, and another portion of the collision load may be transmitted smoothly to the tunnel 22 with the second curved wall portion 56 being a load transmission path. Namely, the load transmitting efficiency may be more improved.

Here, the minimum radius of curvature R1 at the curved shape of the first curved wall portion 54 is set to be larger than the minimum radius of curvature R2 at the curved shape of the second curved wall portion 56. Therefore, at the front side member base portion 44, the bending rigidity with respect to load, that attempts to bend the front side member base portion 44 toward the first curved wall portion 54 side (the vehicle body transverse direction outer side), is higher than the bending rigidity with respect to load that attempts to bend the front side member base portion 44 toward the second curved wall portion 56 side (the vehicle body transverse direction inner side). Accordingly, at the time of a front collision, the front side member base portion 44 bending toward the vehicle body transverse direction outer side may be suppressed effectively, and, as a result, displacement of the front side member main body portion 42 toward the vehicle body transverse direction outer side may be suppressed.

Further, in the present embodiment, the front end flange portion 50A of the rear side first connecting portion 50 is joined to the front end surface 24A that faces toward the vehicle body front side at the frontmost end of the rocker 24. Further, the first curved wall portion 54 is curved along the circular-arc shape 60 whose tangent lines are respectively the first virtual straight line L1, that, as seen in a vehicle body bottom view, passes through the side surface 46X at the vehicle body transverse direction outer side of the front side connecting portion 46 and extends in the extending direction of this side surface 46X, and the second virtual straight line L2, that passes through the front end surface 50X of the rear side first connecting portion 50 and extends in the vehicle body transverse direction, and the circular-arc shape 60 passes through the rear end 46Z of the side surface 46X at the vehicle body transverse direction outer side of the front side connecting portion 46 and through the vehicle body transverse direction inner side end 50Z of the front end surface 50X of the rear side first connecting portion 50. Due thereto, the radius of curvature R1 of the first curved wall portion 54 can be set to be large, while the rear end portion of the outer-side side wall portion 46A of the front side connecting portion 46 and the front end flange portion 50A of the rear side first connecting portion 50 are connected gently by the first curved wall portion 54. Therefore, the ability to transmit load from the front side member base portion 44 to the rocker 24 at the time of a front collision of the vehicle may be ensured well, and the bending rigidity with respect to load, that attempts to bend the front side member base portion 44 toward the first curved wall portion 54 side (the vehicle body transverse direction outer side), may be ensured well.

As described above, in accordance with the vehicle frame structure of the present disclosure, even if the front side member main body portion 42 is disposed so as to be inclined toward the vehicle body transverse direction outer side while heading toward the vehicle body front side, collision load may be transmitted well by preventing or suppressing bending of the front side member base portion 44 (the supporting portion of the rear end portion of the front side member main body portion 42) at the time of a front collision of the vehicle.

Note that it is preferable to not form, even locally, small convex and concave portions (that are other than the overall curved shapes of the first curved wall portion 54 and the second curved wall portion 56) at the first curved wall portion 54 and the second curved wall portion 56. However, in light of the relationship with peripheral structures and the like for example, small convex and concave portions may be formed locally at the first curved wall portion 54 and the second curved wall portion 56 separately from the overall curved shapes of the first curved wall portion 54 and the second curved wall portion 56. Here, the "minimum radius of curvature at a curved shape of the first curved wall portion" of the first aspect means, even if small convex and concave portions are formed locally at the first curved wall portion separately from the overall curved shape of the first curved wall portion, the minimum radius of curvature at the overall curved shape excepting these convex and concave portions. Similarly, the "minimum radius of curvature at a curved shape of the second curved wall portion" of the first aspect means, even if small convex and concave portions are formed locally at the second curved wall portion separately from the overall curved shape of the second curved wall portion, the minimum radius of curvature at the overall curved shape excepting these convex and concave portions.

Further, in the above-described embodiment, the curved shape of the first curved wall portion 54 is made to be a circular-arc shape whose radius of curvature is substantially constant as seen in a vehicle body bottom view. However, the curved shape of the first curved wall portion may be, for example, a curved shape that is continuous without distortion while the radius of curvature thereof gradually changes as seen in a vehicle body bottom view. The same holds for the curved shape of the second curved wall portion as well.

Further, in the above-described embodiment, the vehicle frame structure 10 is structured so as to be basically symmetrical to the left and the right, and a case in which the structure illustrated in FIG. 1 is provided at the both left and right sides of the vehicle body is described. However, a structure, in which a structure such as that illustrated in FIG. 1 is provided only at the vehicle body left side, or a structure, in which a structure such as that illustrated in FIG. 1 is provided only at the vehicle body right side, also may be employed.

Note that "single member" of the first aspect is a member in which the entirety thereof is formed integrally without plural members being structural elements thereof, such as the front side member base portion 44 of the above-described embodiment.

Further, the concept of "is curved along a circular-arc shape" of the second aspect includes cases in which the region between the rear end portion of the side wall portion at the vehicle body transverse direction outer side of the front side connecting portion and the front end portion of the rear side first connecting portion is curved so as to coincide with this circular-arc shape as seen in a vehicle body bottom view, and in addition, also includes cases in which, as in the above-described embodiment, this region does not completely coincide with the circular-arc shape 60 as seen in a vehicle body bottom view, but the region is curved substantially similarly to the circular-arc shape 60 when viewed overall, and can be considered as being curved along the circular-arc shape 60.

Note that the above-described embodiment and above-described plural modified examples can be implemented by being combined appropriately.

Although an example of the present disclosure has been described above, the present disclosure is not limited to the above, and, other than the above, can of course be embodied by being modified in various ways within a scope that does not depart from the gist thereof.

What is claimed is:

1. A vehicle frame structure, comprising:
a front side member main body portion disposed at a side portion of a vehicle body front portion, at an incline toward a vehicle body transverse direction outer side on progression toward a vehicle body front side; and
a front side member base portion extending along a dash panel toward a vehicle body rear and lower side, and formed in a shape such that a rear end side of the front side member base portion is wider in a vehicle body transverse direction than a front end side of the front side member base portion, the front side member base portion being joined to the dash panel and structured by a single member, and a vehicle body transverse direction intermediate portion of the front side member base portion being joined to a front end portion of a floor under reinforcement, the front side member base portion including:
a front side connecting portion joined to an outer peripheral surface of a rear end portion of the front side member main body portion in a state of covering the outer peripheral surface;
a rear side first connecting portion joined to a front end portion of a rocker;
a rear side second connecting portion that is joined to a front end portion of a tunnel;
a first curved wall portion connecting a rear end portion of a side wall portion at a vehicle body transverse direction outer side of the front side connecting portion and a front end portion of the rear side first connecting portion, the first curved wall portion being curved so as to be concave obliquely toward a vehicle body rear side and a vehicle body transverse direction inner side; and
a second curved wall portion connecting a rear end portion of a side wall portion at a vehicle body transverse direction inner side of the front side connecting portion and a front end portion of the rear side second connecting portion, the second curved wall portion being curved so as to be concave obliquely toward the vehicle body rear side and the vehicle body transverse direction outer side, and
the front side member base portion being configured such that a relationship between a minimum radius of curvature R1 at a curve of the first curved wall portion and a minimum radius of curvature R2 at a curve of the second curved wall portion satisfies R1>R2.

2. The vehicle frame structure of claim 1, wherein:
the front end portion of the rear side first connecting portion is joined to a front end surface, that faces toward the vehicle body front side, at a frontmost end of the rocker, and
the first curved wall portion is curved along a circular arc having respective tangent lines, as seen in a vehicle body bottom view, of a first virtual straight line passing through a side surface at the vehicle body transverse direction outer side of the front side connecting portion and extending in a direction of extension of the side surface, and a second virtual straight line passing through a front end surface of the rear side first connecting portion and extending in the vehicle body transverse direction, and the circular arc passes through a rear end of the side surface at the vehicle body transverse direction outer side of the front side connecting portion and through a vehicle body transverse direction inner side end of a front end surface of the rear side first connecting portion.

* * * * *